United States Patent [19]

Duke

[11] Patent Number: 5,296,009
[45] Date of Patent: Mar. 22, 1994

[54] DEMISTER PANEL

[76] Inventor: Eddie D. Duke, P.O. Box 296, Tenaha, Tex. 79574

[21] Appl. No.: 83,626

[22] Filed: Jun. 28, 1993

[51] Int. Cl.⁵ .................................. B01D 47/00
[52] U.S. Cl. .................. 55/440; 55/257.2; 55/443; 55/444
[58] Field of Search ............ 55/257.2, 257.3, 440, 55/442–446

[56] References Cited

U.S. PATENT DOCUMENTS 3,912,471 10/1975 Cotton .................... 55/440
4,500,330 2/1985 Bradley et al. ............. 55/440 X
4,530,707 7/1985 Ovard ....................... 55/440
4,968,328 11/1990 Duke ....................... 55/440 X Primary Examiner—Charles Hart
Attorney, Agent, or Firm—John M. Harrison

[57] ABSTRACT

Improved liquid-gas contact or demister panels for gas treating equipment, wherein each panel is designed with inlet and outlet sections and is fitted with a shaped flange on one end. A high strength assembly or array of panels is provided by interlocking alignment and fastening apparatus, which includes the shaped flange, along with tabs and slots formed in each panel.

20 Claims, 2 Drawing Sheets

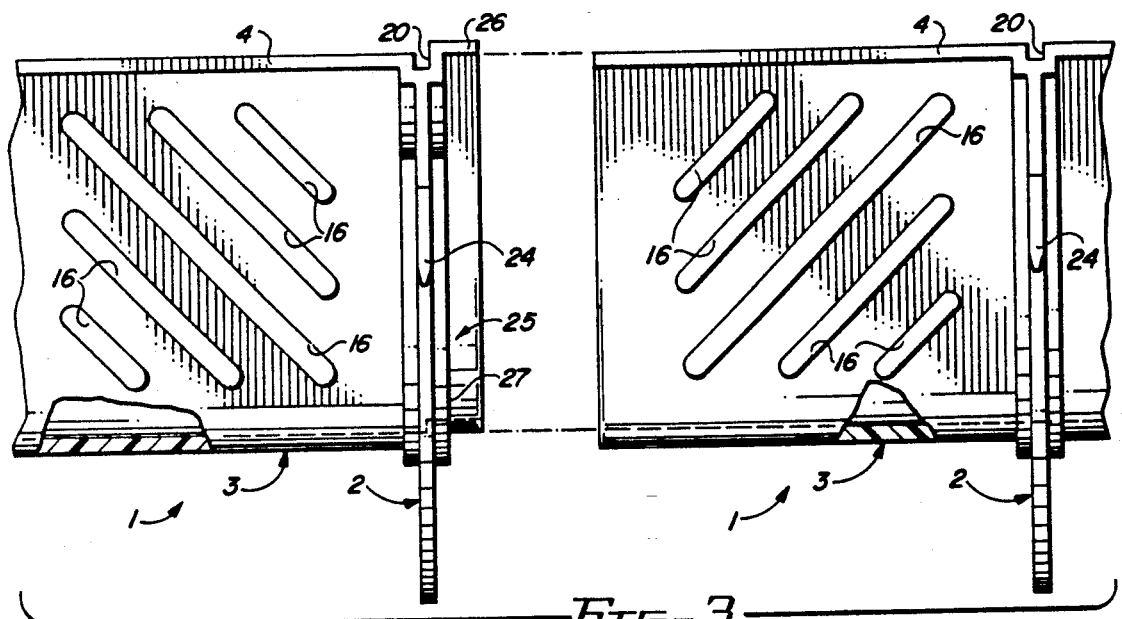
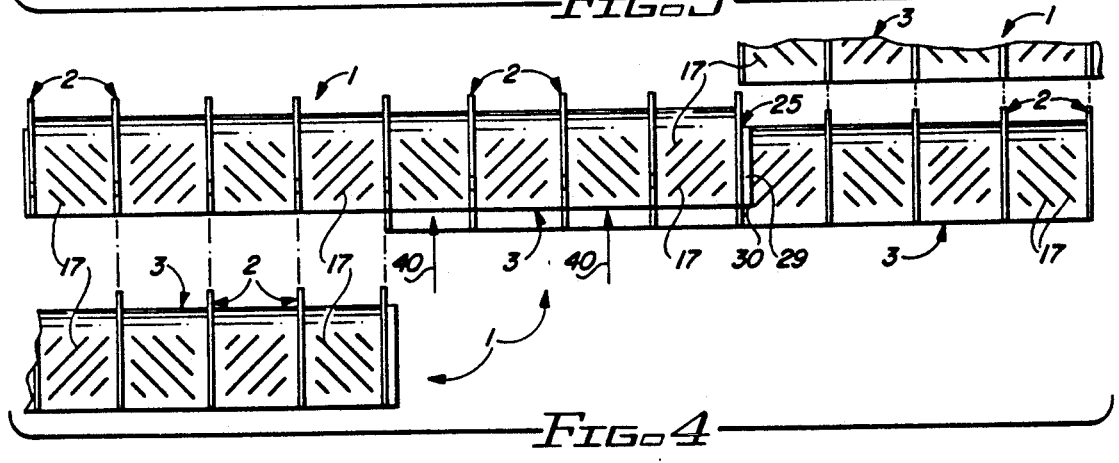

DEMISTER PANEL

BACKGROUND OF THE INVENTION

1. Field of the Invention

This invention relates to liquid gas contact or demister panels or baffles and an assembly or array of these panels for separating liquid droplets or mist from a gas stream using multiple, shaped impingement panel surfaces. The panels interlock by means of a tab and slot system, along with stabilizing and aligning end flanges, to define an array which can be configured to the processing apparatus in which the array is mounted. An incoming liquid-entrained gas stream impinges on the surfaces of the panel array, wherein entrained liquid contacts and clings to the panel or baffle surface, allowing the liquid to run or drain from the surface, clear of the gas stream.

2. Description of the Prior Art

Mist separators or eliminators of the impingement or baffle type are used in numerous applications in industry. Typical applications are scrubbers associated with the burning of hydrocarbon or carbon-based fuels, which scrubbers are used to remove sulfur gases, carbon monoxide and/or particulate material from flue gases. One such process using a demister is described in U.S. Pat. No. 4,028,077, to Gleason. Another typical demister application is in processing or refining liquid-gas hydrocarbon systems and a typical process is described in U.S. Pat. No. 1,553,973, to Ballou. Other gas liquid systems are described in literature such as Mass-Transfer Operations by Treybal, published by McGraw-Hill Book Company in 1955. Still other gas liquid systems and demister baffles, panels or elements are described in U.S. Pat. No. 621,998, to Farley, et al; U.S. Pat. No. 1,567,313 to Wilson, et al; U.S. Pat. No. 2,221,989 to Mount; U.S. Pat. No. 3,208,204 to PerOskar Persson; U.S. Pat. No. 3,785,121 to Phelps; U.S. Pat. No. 3,805,496 to Sokolowski; U.S. Pat. No. 4,107,241 to Braun; U.S. Pat. No. 4,198,215 to Regehr; U.S. Pat. No. 4,263,025 to Grodare; and my U.S. Pat. No. 4,968,328.

This invention includes an improvement in gas treating and gas-liquid contact and separation apparatus and in a structural array of such apparatus. In a preferred embodiment a preferred configuration and combination of panel or baffle elements is assembled using stabilizing and aligning end flanges, tabs and tab slots for assembling a panel array and controlling gas stream impingement on the generally V-shaped panels, whereby liquid droplets in the gas stream are attached to the panel surfaces, merged into or coalescing with a liquid film on the surface and drainage elements are provided in the panels to remove the coalesed liquid from the baffle surface in a manner designed to reduce or prevent reentrainment of the liquid in the gas stream. A preferred embodiment includes a panel or baffle array or configuration which is structurally strong and oriented for efficiently removing liquid from the gas stream with very low pressure drop in the gas stream. The flanged assembly or array provides a high strength contact surface that can be easily assembled in a staggered array from multiple, shaped gas-contact panels with a minimum amount of labor and skill required. These panels and the assembly or array are capable of withstanding rough handling and abuse during transport, assembly, placement and operation. Generally, a preferred embodiment of the invention includes an array constructed of multiple liquid gas contact panels or baffles for separating liquid droplets from a gas stream. The array includes at least two panels arranged in a stacked, staggered configuration, forming sinusoidal channels between the panels with each panel having a flange on one end, a first curved surface defining the sinusoidal gas path and multiple, spaced ribs which are perpendicular to the curved surface. Accordingly, when multiple panels are arranged adjacent to each other in an array, each flange supports a linear adjacent panel and the inner curved surface of one panel forms with the outer curved surface of the parallel, staggered adjacent panel, a channel having a generally rectangular cross-section which determines or controls the path of the gas stream.

In another preferred embodiment, each demister panel is formed having at least one male tab and at least one female slot designed and located to fit together and interlock with a corresponding slot and tab, respectively, on a parallel adjacent baffle or panel, so that parallel adjacent panels can be positioned in a staggered array, aligned in linear assembly using the end flanges and fastened into the integral array using the tabs and slots. Furthermore, the flange provided on the end of each panel for strengthening the assembled panel array is preferably formed or shaped integrally with each panel. The tabs and slots are shaped along with the flanges to physically align and interlock the panels, and can be secured in interlocking, arrayed relationship by thermal, solvent or chemical reaction welding, in nonexclusive particular.

BRIEF DESCRIPTION OF THE DRAWINGS

The invention will be better understood by reference to the accompanying drawings, wherein:

FIG. 3 is a top view, partially in section, of a flanged connection between linearly aligned liquid gas contact panels of this invention; and FIG. 4 is a front, partially exploded view of a typical staggered array of the liquid gas contact panels illustrated in FIGS. 1–3.

DESCRIPTION OF THE PREFERRED EMBODIMENTS

Figures 1, 2:
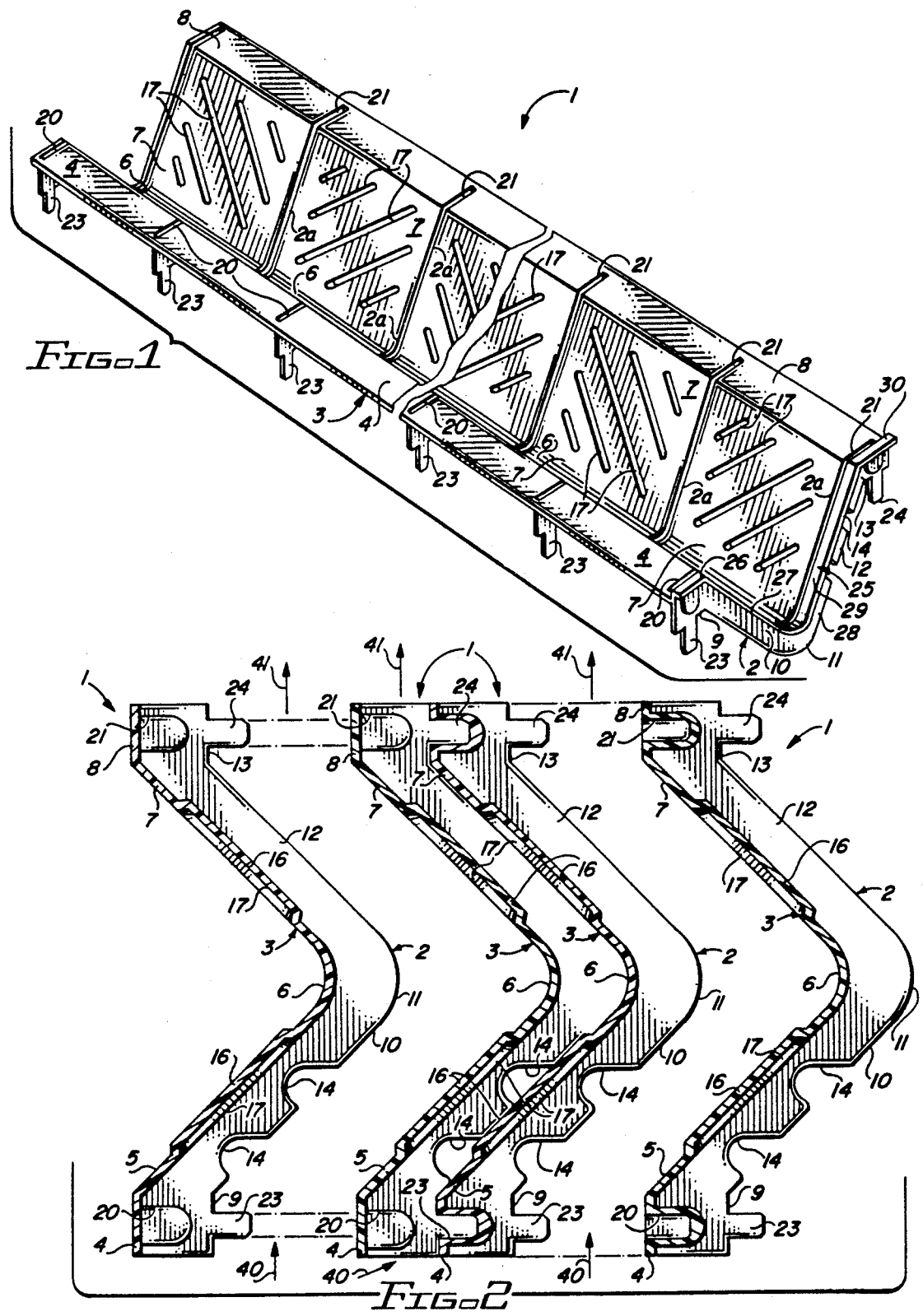
FIG. 1 is a perspective view of a preferred embodiment of the liquid-gas contact panel of this invention.
FIG. 2 is a side sectional view of multiple liquid-gas contact panels in both assembled and non-assembled, parallel and aligned configuration.

Referring initially to FIGS. 1 and 2 of the drawings, the liquid gas contact or demister panel of this invention is generally illustrated by reference numeral 1 and includes a generally V-shaped panel plate 3, which supports multiple, spaced, outwardly-extending panel ribs 2. The panel plate 3 and panel ribs 2 may be integrally molded of an injection-moldable material such as polypropylene or the like, or the demister panel 1 may be constructed of ceramic or metal, as desired. The panel plate 3 is characterized by an inlet section 4, a first sloped section 5 extending from the inlet section 4 to a concave section 6 and a second sloped section 7 extending from the concave section 6 to an outlet section 8. Similarly, the panel rib 2 includes a rib inlet section 9, which corresponds to the inlet section 4 of the panel plate 3; a first sloped rib section 10, which corresponds to the first sloped section 5 of the panel plate 3; a concave rib section 11 which lies adjacent to the concave section 6 of the panel plate 3; a second sloped rib section 12, which lies adjacent to the second sloped section 7 of the panel plate 3; and an outlet rib section 13 which projects adjacent to the outlet section 8 of the panel plate 3. Rib openings 14 are provided in each panel rib 2 for purposes which will be further hereinafter described and multiple rib slots 2a are provided in the base of each of the panel ribs 2 to receive a corresponding set of panel ribs 2 when multiple units of the demister panel 1 are joined in parallel, staggered alignment, as illustrated in FIG. 2 and as further hereinafter described.

In a preferred embodiment of the invention the panel plate 3 and the panel rib 2 are integrally formed of a plastic material by techniques which are well known to those skilled in the art. The plastic may be thermoplastic, thermosetting, inert or chemically-reactive plastic such as polyethylene, polypropylene, polyvinylchloride, phenol-urea type polymer, polyester-nylon or a fluorinated polymer, in non-exclusive particular. In some applications it may be necessary or desirable to use ceramic materials or cast or stamped metal to form the panel plate 3 and panel rib 2, especially for high temperature and/or corrosive conditions. Joining of at least two of the demister panels 1 in parallel relationship as illustrated in FIG. 2 forms paths through which a gas stream may flow, as indicated by the arrow at 40. As further illustrated in FIG. 2 the respective demister panels 1 are assembled in the illustrated parallel configuration by aligning respective inlet section tabs 23 and outlet section tabs 24, projecting from one demister panel 1, with corresponding inlet section slots 20 and outlet section slots 21, respectively, in a second demister panel 1. The demister panels nest or stack in the parallel, adjacent configuration illustrated in FIG. 2, but are staggered, as illustrated in FIG. 4, to facilitate the typical inlet gas stream flow paths 40, which describe a tortuous path between the respective panel plates 3 and against the corresponding panel ribs 2, where the inlet gas stream paths 40 intermingle through the rib openings 14. Additional contact surfaces are provided on the panel plates 3 by the provision of multiple channels 16, which define corresponding channel slots 17 in the first sloped sections 5 and second sloped sections 6. The inlet gas streams 40 exit the conduits formed by parallel, adjacent demister panels 1 at outlet gas streams 41. Accordingly, it will be appreciated from a consideration of the demister panels 1 that stacking of multiple units of the demister panels 1 in the parallel, adjacent configuration illustrated in FIG. 2 provides multiple gas-liquid contact channels for demisting the inlet gas streams 40. Contact between a second stream (not illustrated) and the inlet liquid stream 42 in countercurrent flow may also be effected to achieve a desired mass transfer and/or heat transfer between the streams using the assembly of demister panels 1 according to the teachings of this invention.

In a preferred embodiment of the invention, in order to achieve maximum assembly strength, the respective inlet section tabs 23 and outlet section tabs 24 may be positively seated in corresponding inlet section slots 20 and outlet section slots 21, respectively, of the demister panels 1, by placing rods, rivets or similar fasteners through the inlet section slots 20 and outlet section slots 21, respectively, to join the inlet section tabs 23 and outlet section tabs 24 to the inlet section slots 20 and outlet section slots 21, respectively. Alternatively, these junctions can be welded by thermal, sonic chemical reaction or solvent techniques, according to the knowledge of those skilled in the art.

Since the demister panels 1 must be mounted in towers or structures of different dimensions and shapes, a high degree of structural integrity, coupled with ease of shaping the panel array, is important to facilitate this objective. Demister panels 1 are normally fitted in such a structure in a staggered, one-half panel overlap relationship, as illustrated in FIG. 4, in order to impart additional strength to the assembly. This strength, as well as improved ease of end-to-end, or linear alignment of the demister panels 1, is enhanced by providing a flange 25 on one end of each of the liquid gas contact panels 1, as illustrated in FIGS. 3 and 4. As illustrated in FIGS. 1 and 3, each flange 25 is characterized by an inlet flange segment 26, which corresponds to the inlet section 4 of the panel plates 3 and the rib inlet section 9, a first sloped flange segment 27, extending from the inlet flange segment 26 and corresponding to the first sloped section 5 of the panel plate 3, as well as the first sloped rib section 10; a concave flange segment 28, which corresponds to the concave section 6 of the panel plate 3 and the concave rib section 11; a second sloped flange segment 29, extending from the concave flange segment 28 and corresponding to the second sloped section 7 of the panel plate 3 and the second sloped rib section 12; and an outlet flange segment 30, extending from the second sloped flange segment 29 and corresponding to the outlet section 8 of the panel plate 3 and the outlet rib section 13. As in the case of the panel rib 2 and panel plate 3, each flange 25 is preferably formed integrally with the corresponding panel plate 3 and panel rib 2 in the molding or casting process. Accordingly, referring again to FIGS. 3 and 4 of the drawings, the demister panels 1 can be assembled in the overlapped, staggered configuration illustrated in FIG. 4 by matching a non-flanged end with the flange 25 on the opposite end of an adjacent, linearly-aligned demister panel 1, as illustrated in FIG. 3 to support the demister panels 1 in the configuration illustrated in FIG. 4. Furthermore, these flanged joints can be secured by welding or otherwise, in the manner described above, thus forming an array that can withstand the rough treatment and adverse conditions encountered during construction and operation of a chemical processing unit. It will be further appreciated by those skilled in the art that the width and thickness of the flange 25 can be chosen to provide sufficient structural integrity for the demister panels 1 in order to support and strengthen the demister panels 1 in the partial array or configuration illustrated in FIG. 4. Furthermore, under circumstances where the demister panels 1 are constructed of plastic such as polypropylene or the like, the panels can be mechanically shaped by a saw, torch or other techniques to conform them to the configuration of the tower or process unit in which they are installed. Moreover, the demister panel 1, in the array illustrated in FIG. 4 or an alternative array, may be mounted on suitable support grids, frames and the like, (not illustrated), according to the knowledge of those skilled in the art, in order to present the demister panels 1 in the position illustrated in FIG. 2, such that the inlet gas streams 40 may travel upwardly to present maximum contact area, as heretofore described.

Gas-liquid systems with which the demister panel 1 of this invention may be used, include aqueous and non-aqueous solutions and mixtures of inorganic, organic and hydrocarbon materials, the temperature, pressure and corrosiveness of which may vary widely. The temperature and corrosive nature of the gas-liquid system and flow characteristics of the liquid and associated solids will determine the material of construction to be used to construct the demister panels 1.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. An array of demister panels for separating liquid droplets from a gas stream, each of said panels having a flanged end and a non-flanged end, said panels characterized by a V shaped cross-section and V-shaped flange means provided on said flanged end of each of said panels for engaging said non-flanged end of an adjacent one of said panels, whereby said flange means stiffens and supports said panels in said array.

2. The array of claim 1 comprising ribs provided on each of said panels, wherein the ribs of one of said panels rest against an adjacent, substantially parallel one of said panels when said panels are disposed in said array.

3. The array of claim 2 comprising at least one male tab provided in at least one of said ribs and at least one female slot provided in said panels, wherein said male tab in said at least one of said ribs of one of said panels engages said female slot in an adjacent, substantially parallel one of said panels when said panels are disposed in said array.

4. The array of claim 1 comprising channels provided in said panels, each of said channels defining a channel slot for increasing the surface area of said panels and aiding in separating the liquid droplets from the gas stream.

5. The array of claim 4 comprising a plurality of ribs provided on each of said panels, wherein the ribs of one of said panels rest against an adjacent, substantially parallel one of said panels when said panels are disposed in said array.

6. The array of claim 5 comprising at least one male tab provided in at least one of said ribs and at least one female slot provided in said panels, wherein said male tab in said at least one of said ribs of one of said panels engages said female slot in an adjacent, substantially parallel one of said panels when said panels are disposed in said array.

7. The array of claim 2 comprising rib openings provided in said ribs, whereby the gas stream communicates through said rib openings between respective ones of said panels in said array.

8. The array of claim 7 comprising at least one male tab provided in at least one of said ribs and at least one female slot provided in said panels, wherein said male tab in said at least one of said ribs of one of said panels engages said female slot in an adjacent, substantially parallel one of said panels when said panels are disposed in said array.

9. The array of claim 8 comprising channels provided in said panels, each of said channels defining a channel slot for increasing the surface area of said panels and aiding in separating the liquid droplets from the gas stream.

10. In an apparatus for separating liquid droplets from a gas stream having an array of panels arranged to form generally sinusoidal gas flow channels between adjacent panels, each of said panels having a flanged end and an unflanged end, an inlet section connected to a first sloped section which is connected to a second sloped section by a curved section and the second sloped section is connected to an outlet section, and spaced-apart ribs extending outwardly from, and generally perpendicular to, a front surface of each of said panels, such that said ribs of one of said panels form generally rectangular cross-sectional channels between said ribs, the front surface of said one of said panels and a back surface of an adjacent one of said panels, wherein each of said ribs has at least one male tab and at least one female slot designed and located such that said male tab and said female slot of one of said panels fits and interlocks with said male tab and said female slot, respectively, of an adjacent one of said panels, wherein an integral assembly of said panels is formed, the improvement comprising flange means provided on said flanged end of each of said panels for engaging said unflanged end of a linear adjacent one of said panels and stabilizing selected ones of said panels in linear relationship in said array.

11. The apparatus of claim 10 wherein said ribs have the same general, cross-sectional configuration as said panels, wherein said ribs of one of said panels fit closely against the back surface of an adjacent one of said panels and comprising collecting channels formed in said panels for collecting and holding liquid separated from the gas stream.

12. The apparatus of claim 10 comprising channel slots provided in at least one of said sloped sections of said panels for channeling the liquid droplets from the gas stream.

13. The apparatus of claim 10 wherein said ribs have the same general, cross-sectional configuration as said panels, wherein said ribs of one of said panels fit closely against the back surface of an adjacent one of said panels and comprising collecting channels formed in said panels for collecting and holding liquid separated from the gas stream and channel slots provided in at least one of said sloped sections of said panels for channeling the liquid droplets from the gas stream.

14. The apparatus of claim 10 wherein said ribs have the same general, cross-sectional configuration as said panels, wherein said ribs of one of said panels fit closely against the back surface of an adjacent one of said panels and comprising collecting channels formed in said panels for collecting and holding liquid separated from the gas stream and openings provided in said ribs adjacent to the first sloped section of an adjacent one of said panels so as to allow gas to pass laterally from one of said gas flow channels to an adjacent one of said gas flow channels.

15. The apparatus of claim 14 comprising channel slots provided in at least one of said sloped sections of said panels for channeling the liquid droplets from the gas stream.

16. In an apparatus for treating a gas stream by passing the stream through an array of contact panels having a generally sinusoidally curved surface extending between a flanged end and an unflanged end and spaced-apart ribs extending outwardly from said curved surface, wherein each of said ribs has at least one male tab and at least one female slot designed and located such that said male tab and said female slot of one of said panels fits and interlocks with the female slot and male tab, respectively, of an adjacent one of said panels, wherein integral assembly of said panels is formed, the improvement comprising a flange provided on said flanged end of each of said panels for engaging said unflanged end of one of said panels and stabilizing selected ones of said panels in linear relationship in said array.

17. The apparatus of claim 16 wherein said panels are formed of thermoplastic material and are further interlocked in said array by welding said male tab into said female slot.

18. The apparatus of claim 16 wherein said at least one male tab comprises a plurality of male tabs extending from said ribs, respectively, and said at least one female slot comprises a plurality of female slots provided in said panels, whereby said male tabs engage said female slots in a selected staggered arrangement of said panels to define said array.

19. The apparatus of claim 18 wherein said panels are formed of thermoplastic material and are further interlocked in said array by welding said male tab into said female slot.

20. The apparatus of claim 19 comprising channel slots provided in said curved surfaces of said panels for channeling the liquid droplets from the gas streams.

* * * * *